July 12, 1949.  R. C. BOHANNAN  2,476,023
SEALING MEANS FOR MIXING DRUMS OF
END-LOADING TRANSIT MIXERS
Filed July 16, 1947  2 Sheets-Sheet 1

INVENTOR.
Robert C. Bohannan
BY
Corbett, Mahoney & Miller
ATTORNEYS

July 12, 1949.　　　　　R. C. BOHANNAN　　　　　2,476,023
SEALING MEANS FOR MIXING DRUMS OF
END-LOADING TRANSIT MIXERS Filed July 16, 1947　　　　　　　　　　　　　2 Sheets-Sheet 2

INVENTOR.
*Robert C. Bohannan.*
BY
*Cubitt, Mahony + Miller*
ATTORNEYS

Patented July 12, 1949

2,476,023

UNITED STATES PATENT OFFICE 2,476,023

SEALING MEANS FOR MIXING DRUMS OF END-LOADING TRANSIT MIXERS

Robert C. Bohannan, Columbus, Ohio, assignor to The Jaeger Machine Company, Columbus, Ohio, a corporation of Ohio Application July 16, 1947, Serial No. 761,279

3 Claims. (Cl. 259—161)

My invention relates to sealing means for mixing drums of end-loading transit mixer. It has to do, more specifically, with sealing means associated with an end loading hopper that is supported in cooperation with the end of a mixing drum for charging batch material thereinto and for permitting discharge of mixed material from the drum.

The difficulty of providing an effective and wear-resistant seal between the rotatable mixing drum and the stationary charging hopper of a truck mixer, such as a concrete mixer, or other transit mixer is well known in the art. The seal must be such that the highly abrasive material, both batch material and mixed material but especially mixed material, will be prevented from entering between the sealing surfaces and thereby causing quick wearing and deteriorating of such surfaces. If the seal is metal-to-metal and the abrasive material works between such surfaces, wearing of such surfaces occurs very rapidly. On the other hand, if one of such surfaces is of yieldable or compressible material, such as rubber, the wear caused by such abrasive material is lessened but still occurs rapidly. This is especially true if the yieldable sealing material is compressed against a metal sealing surface which produces rapid wear of the sealing material even when not subjected to abrasives. Therefore, it has been proposed to use a yieldable sealing material between the hopper and the drum which is so arranged that it acts as a seal between the two relatively rotatable members but is not compressed therebetween because of means provided for holding such members in spaced relationship. It is also desirable that the seal be of such a nature that a lubricant can be forced under pressure between the sealing members.

One of the objects of my invention is to provide sealing means between the relatively rotatable drum and charging hopper of a mixer which consists of a combination lubricated metal-to-metal seal and a seal embodying a yieldable member which contacts in sealing relationship with an associated metal member without being compressed.

Another object of my invention is to provide sealing means of the type indicated which is so arranged that it is very difficult for abrasive material to reach the yieldable sealing member and it is practically impossible for it to reach the metal-to-metal seal.

Another object of my invention is to provide sealing means of the type indicated which can be supplied with a lubricating substance under pressure which lubricates cooperating sealing surfaces and aids in preventing the entrance of abrasive material therebetween.

Still another object of my invention is to provide sealing means of the type indicated wherein the various cooperating sealing members can be removed with ease for cleaning or for replacement after a long period of use.

A further object of my invention is to provide sealing means which not only obtains the objects indicated above but is extremely simple and can be applied to a mixer at low cost.

Various other objects will be apparent.

A preferred embodiment of my invention is illustrated in the accompanying drawings wherein similar characters of reference designate corresponding parts and wherein.

Figures 1, 2:
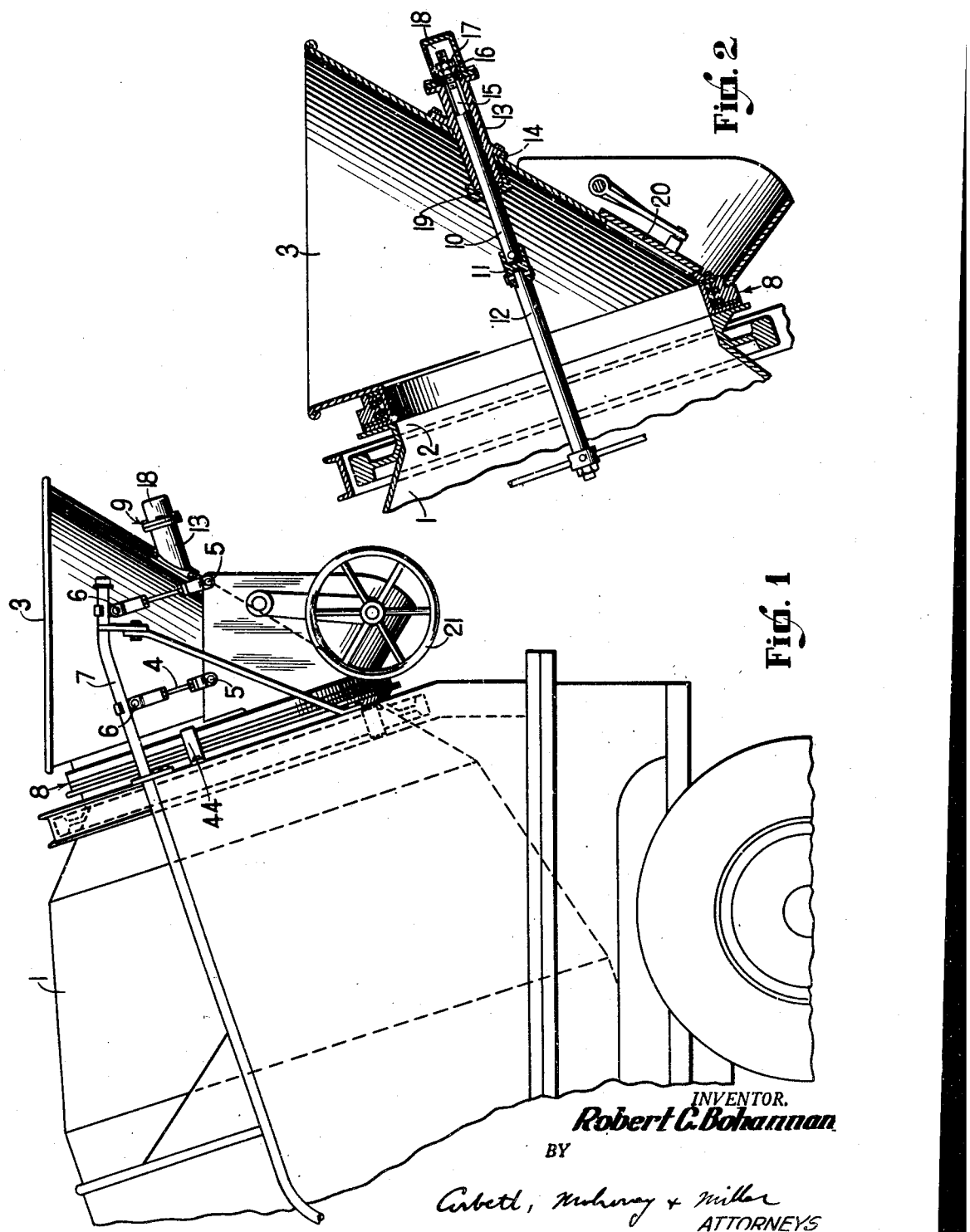
Figure 1 is a side elevational view of the rear portion of a truck mixer having a charging hopper associated therewith, the sealing means of my invention being provided between the drum and the hopper.
Figure 2 is a vertical sectional view taken through the hopper and the associated end of the drum illustrating more in detail my sealing means which is associated therewith.

With reference to the drawings, in Figure 1 I have illustrated a truck mixer as an example of apparatus with which my sealing means may be associated. This truck mixer is of the high-dump type and includes a rearwardly and upwardly inclined rotatable mixing drum 1. Associated with the opening 2 of the drum, as shown in Figures 1 and 2, is a charging hopper 3. This hopper 3 is non-rotatably supported on the truck mixer by means of a plurality of adjustable suspending links 4 which have their lower ends pivotally attached to the hopper, as at 5, and which have their upper ends pivotally attached, as at 6, to the rearwardly extending portions of rods 7 which are suitably supported on the frame of the mixer. My sealing means, indicated generally by the numeral 8, is provided between the non-rotatable hopper 3 and the rotatable drum 1. The links 4 are so arranged that the hopper tends to swing forwardly against the end of the drum, due to gravity. However, to further aid in keeping the hopper in proper association with the drum, an adjustable rod unit 9 is provided.

This unit 9 includes a rod 10, associated with the rear wall of the hopper, having its forward end connected by a swivel joint 11 to the rear end of a projecting rod or pipe 12 which is axially disposed within the mixing drum and projects rearwardly through the opening 2 thereof. The rear end of this rod 10 is slidably disposed within a downwardly and forwardly inclined sleeve 13 which is rigidly attached by a flange 14 to the rear wall of the hopper. The rod 13 carries a bolt 15 which is provided with a washer 16 that engages the end of sleeve 13 and also carries a plurality of lock nuts 17 associated therewith. A cap 18 normally covers nuts 17. A sealing gland 19 is associated with the lower end of sleeve 13 and the rod 10. It will be apparent that tightening nuts 17 will cause the hopper 3 to move more firmly into contact with the end of drum 1.

The rear wall of the hopper, adjacent its lower end, is provided with the usual swingable discharge gate 20. This gate may be actuated by a hand wheel 21 which is suitably connected thereto.

Figure 3:
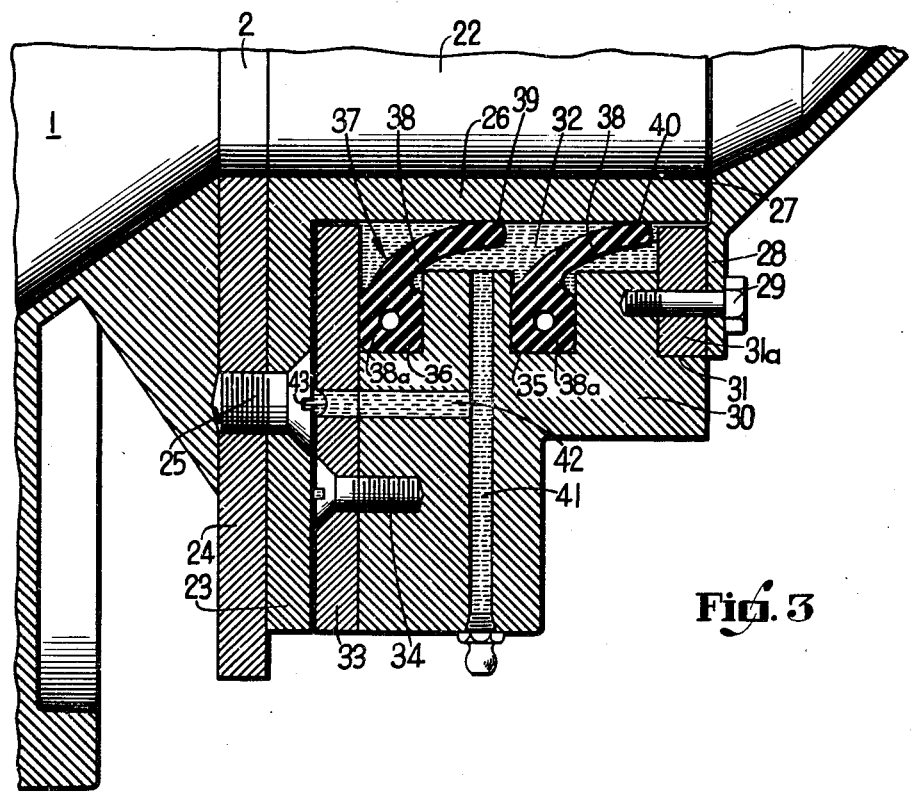
Figure 3 is an enlarged vertical sectional view taken through the associated portions of the hopper and drum and illustrating in detail my sealing means.
Figure 4:
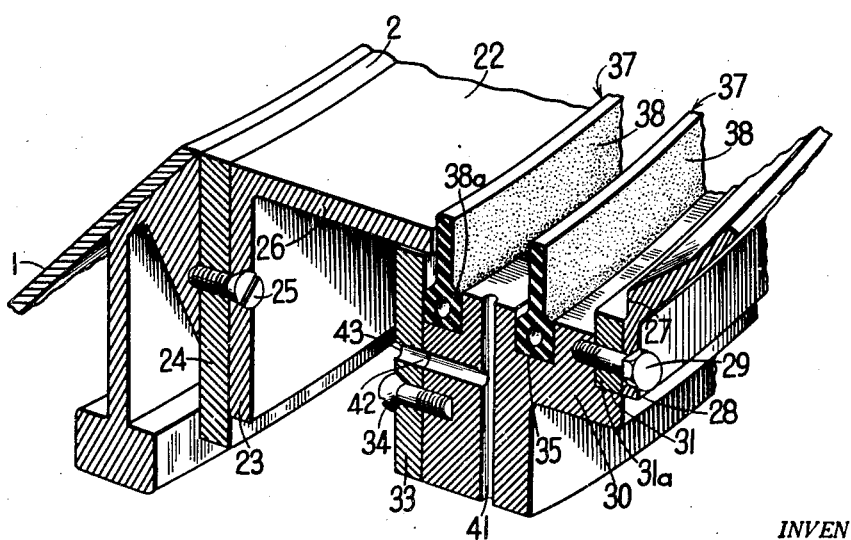
Figure 4 is a perspective view of the sealing means illustrated in Figure 3.

My sealing unit 8 comprises a sealing ring 22 which is formed from a metal angle member and includes, as shown best in Figures 3 and 4, a vertical flange 23 that has its flat forward surface in contact with the flat rear surface of a ring 24 that surrounds the drum opening 2 and which is suitably attached to the drum, for example, by welding. The flange 23 is fastened to the ring 24 by a series of countersunk screws 25. The ring 22 also includes a flange 26 which is disposed co-axial with the opening 2 of the drum and the inner surface of which forms a continuation of such opening. The ring 22, as shown, is disposed between the hopper and the drum. As indicated in Figure 3, the lower end 27 of the rear wall of the hopper is so shaped that its inner surface is flush with the inner surface of the flange 26.

The forward portion of the hopper is provided with an annular peripheral flange 28. This flange is bolted by a series of bolts 29 to a ring member 30 which surrounds the flange 26 of ring 22. The member 30 is provided on its rear surface with a recess or counterbore 31 which receives a ring 31a which is disposed between flange 28 and ring 30 and through which the bolts 29 also pass. This ring 31a surrounds the rear end of flange 26 and aids in keeping ring 30 spaced from flange 26 to provide a lubricant chamber 32 between flange 26 and ring 30. The forward surface of ring 30 has secured thereto a metal flat sealing ring 33 which is attached to member 30 by a series of countersunk screws 34. The ring 33 closely surrounds the flange 26 and also aids in keeping member 30 spaced from such flange. The sealing ring 33 will be closely adjacent or in contact with the rear surface of the flange 23. Thus, the flange 23 and ring 33 will serve as the relatively rotatable contacting metal sealing members. The members 23 and 33 can be brought into proper association by adjusting the rod unit 9. Before the portion 27 of the hopper contacts with the rear edge of flange 26 of ring 22, the surfaces of members 23 and 33 will be in contact.

The inner side of the ring 30 is provided with a pair of axially spaced grooves 35 and 36. The groove 35 is formed in ring 30 adjacent its rear side while the groove 36 is at the forward side of the ring and one of its walls is formed by the ring 33. The grooves 35 and 36 receive yieldable or flexible sealing rings 37 which normally have the shape shown in Figure 4. These rings 37 are preferably formed of rubber and include enlarged base portions 38a, which are forced tightly and snugly into the grooves, and outwardly extending flexible flange portions 38. When the hopper is mounted on the drum, the ring 30, carried by the hopper, is slipped over the flange 26 of ring 22, carried by the drum, as shown in Figure 4. As the hopper is forced rearwardly into association with the drum, the flanges 38 of sealing rings 37 will be flexed rearwardly and downwardly until they are positioned as shown in Figure 3 with the yieldable or resilient flanges bending rearwardly but swinging outwardly in contact with the outer surface of flange 26 at the sealing lines 39 and 40. Rings 31a and 33 cooperate with flange 26 to align the relatively rotatable parts and to prevent radial compression of flexible rings 37. Thus, these members 37 will not be compressed either radially or axially and the flanges 38 thereof will automatically adjust themselves as wear occurs to provide at all times a good seal between such members and the flange 26.

To provide lubricant in the chamber 32 and between the members 23 and 33, I provide the arrangement of lubricant passageways shown in Figures 3 and 4. One of these passageways 41 extends radially through ring 30 and communicates at its inner end with chamber 32 at a point between the two flexible sealing rings 37. The outer end of this passageway is provided with a pressure fitting to which a lubricant supplying gun may be attached. A passageway 42 branches from passageway 41 and extends forwardly through ring 33 and communicates with an opening 43 which extends through ring 33. Thus, lubricant will also be supplied between the members 23 and 33.

Brackets 44 may be attached to the drum at circumferentially spaced points and will have inturned rear ends which extend over ring 30. These brackets will serve as extreme limit stops to keep the rings of my structure in association.

It will be apparent that with the described structure, a very effective seal will be provided between the hopper and the mixing drum. Any material which tends to pass downwardly between the rear end of flange 26 and the wall of the hopper must overcome the pressure of lubricant to enter into the chamber 32. It will be apparent that this lubricant will be under greater pressure in the space in chamber 32 between the sealing rings 37 but that some lubricant will pass beyond such sealing rings, as shown in Figure 3. If the abrasive material does enter chamber 32, it will, therefore, normally tend to collect behind the rearwardmost ring 37. However, if it does pass between the rear ring 37 and flange 26, no injury to such member 37 will result because the ring 37 will merely yield and permit passage of the abrasive material. To reach the cooperating sealing surfaces 23 and 33, it will be necessary for such material to pass both of the yieldable rings 37, which is very unlikely. Furthermore, the lubricant between these surfaces 23 and 33 will also aid in preventing entrance of abrasive material therebetween. The yieldable members 37 will last for very long periods but can be replaced easily and quickly, if necessary, by removing the hopper. Furthermore, ring 33 can be replaced, if necessary, with little trouble. In fact, the ring 30 and the parts which it carries can be detached as a unit from the hopper.

It will be apparent from the above description that I have provided effective and wear-resistant sealing means which is especially useful between the stationary hopper and rotatable drum of a truck mixer. The seal is a combination metal-to-metal seal and yieldable contact seal and, due to the particular arrangement which I provide, is very wear-resistant. Furthermore, the various sealing surfaces are so disposed that there is little danger of abrasive material entering therebetween and especially between the metal-to-metal seal where it would cause more damage.

Various other advantages will be apparent from the preceding description, the drawings, and the following claims.

Having thus described my invention, what I claim is:

1. In a mixer of the type described including a rotatable mixing member having an opening through which aggregate material to be mixed may be fed and mixed material may be discharged, a stationary hopper member mounted on the mixer in cooperation with said opening for directing the aggregate material to be mixed to said opening and for receiving the mixed material from said opening during discharge, sealing means between such relatively rotatable members, said sealing means comprising a first ring carried by one of said members and having an axially extending portion over which said material passes and having a free edge in cooperative relationship with the other member, said first ring also having a sealing surface extending radially at an angle to the axially extending portion thereof, a second ring carried by the other of said members and surrounding the axially extending portion of the first ring, said second ring being provided with an axially extending portion and being provided with a radially disposed sealing surface which is in sealing engagement with the radially extending sealing surface of the first ring, said axially extending portion of the first ring and said axially extending portion of the second ring having an annular chamber therebetween and a pair of flexible sealing flanges disposed in said annular chamber and carried by one of the associated axially extending portions of said first and second rings and extending substantially radially into sealing engagement with the other of said portions, said flexible sealing flanges being located between said radially disposed sealing surfaces and the free edge of said first-named ring to prevent any abrasive fines from the aggregate material which might pass said free edge of the first ring from reaching said radially extending sealing surfaces, said flexible flanges being supported in axially spaced relationship and both being flexed in the same direction away from said radially extending sealing surfaces towards said free edge of the first ring and having their outer free edges in resilient sealing engagement with the said other axially extending portion, and said first and second rings including cooperating aligning portions which hold the axially extending portions of the two rings in radially spaced relationship and substantially close the ends of said annular chamber, said aligning portions also serving to prevent radial compression of said sealing flanges.

2. A structure according to claim 1 wherein a passageway is provided for conducting lubricant to said annular chamber between said axially spaced flexible flanges.

3. A structure according to claim 2 wherein a lubricant passageway is also provided for conducting lubricant between said radially extending sealing surfaces.

ROBERT C. BOHANNAN.

REFERENCES CITED

The following references are of record in the file of this patent:

UNITED STATES PATENTS

| Number | Name | Date |
| --- | --- | --- |
| 1,146,781 | Bowdoin | July 20, 1915 |
| 2,036,537 | Otis | Apr. 7, 1936 |
| 2,063,368 | Roza | Dec. 8, 1936 |
| 2,133,487 | Spargo | Dec. 18, 1938 |
| 2,150,529 | Tremolada | Mar. 14, 1939 |
| 2,265,751 | Ball | Dec. 9, 1941 |
| 2,265,752 | Ball | Dec. 9, 1941 |
| 2,360,345 | Hilkemeier | Oct. 17, 1944 |
| 2,362,435 | Hilkemeier | Nov. 7, 1944 |
| 2,365,048 | Bruno | Dec. 12, 1944 |

FOREIGN PATENTS

| Number | Country | Date |
| --- | --- | --- |
| 9,520 | Great Britain | May 2, 1908 |